March 11, 1924.  1,486,601
M. C. OVERMAN
CUSHION TIRE
Original Filed Nov. 20, 1918
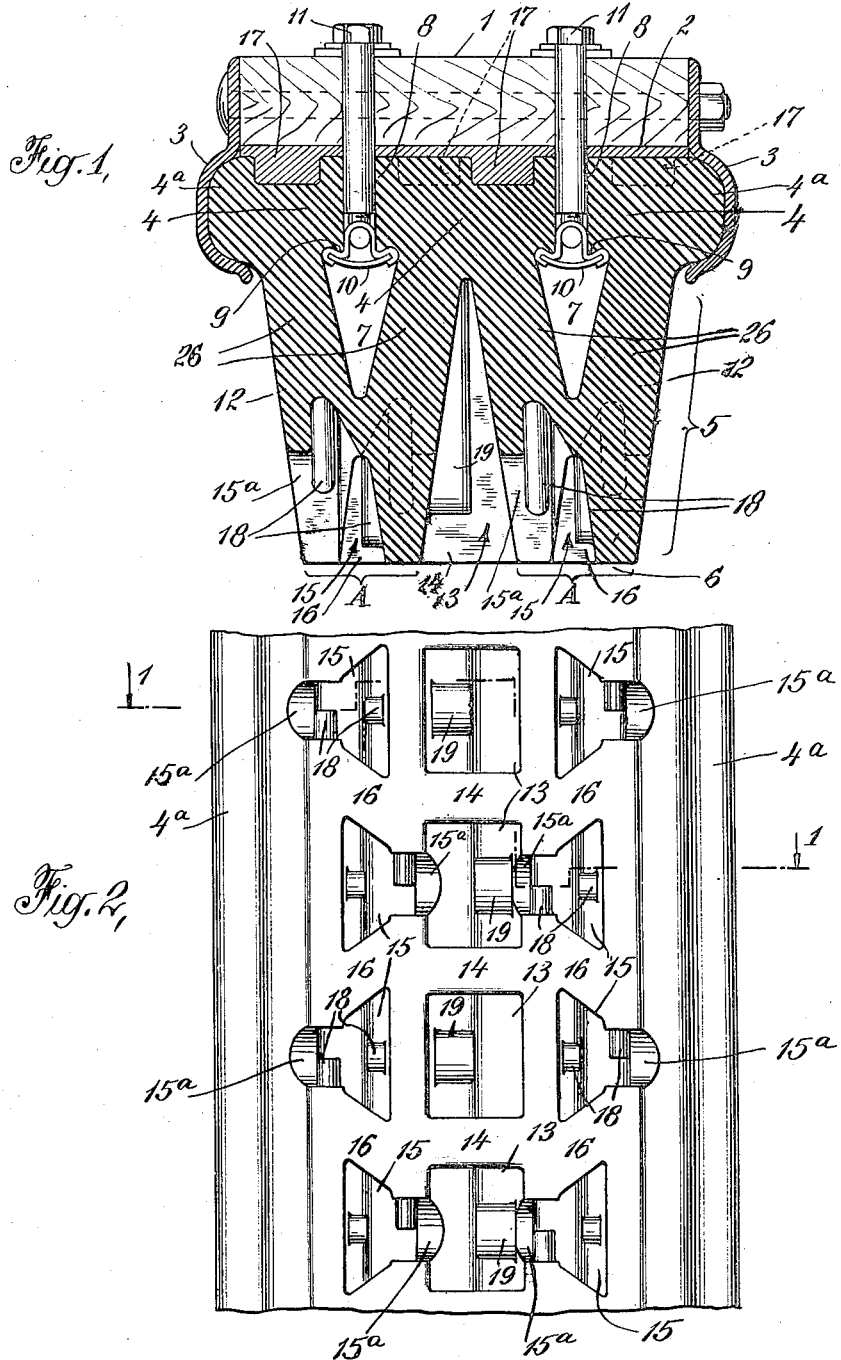
Inventor
Max Cyrus Overman
By his Attorney Patented Mar. 11, 1924.

1,486,601

UNITED STATES PATENT OFFICE.

MAX CYRUS OVERMAN, OF NEW YORK, N. Y.

CUSHION TIRE.

Application filed November 20, 1918, Serial No. 263,368. Renewed March 7, 1922. Serial No. 541,868.

*To all whom it may concern:*

Be it known that I, MAX CYRUS OVERMAN, a citizen of the United States, residing at the city, county, and State of New York, have invented certain new and useful Improvements in Cushion Tires, of which the following is a specification.

My present invention relates to improvements in cushion tires, the features and advantages of which will be apparent to those skilled in the art from an understanding of the following description in connection with the drawings.

In these, showing one of the possible embodiments my invention is adapted to take, Fig. 1 is a cross-section of a tire within my invention, being a section on the line 1—1 in Fig. 2 looking in the direction of the arrows, said Fig. 1 further showing in cross-section a form of flanged wheel-felly to which my tire is secured; and Fig. 2 is an underneath plan view of the tire, of Fig. 1.

The tire is, of course, intended to be made of rubber or rubber compounds or their equivalent; and I will now describe the specific tire and devices of the drawings, the words "upper" and "lower" and similar expressions of location in the description and claims being intended to refer to a section of the tire positioned as in Fig. 1.

1 is the wheel-felly surrounded by the rim 2. 3—3 are the flanges bolted to the sides of the felly.

The tire comprises a wheel-engaging upper-portion 4 confined between the wheel-rim 2 and the flanges 3—3, which latter engage laterally rounded beads 4ª on the sides of this portion of the tire. Integral with said upper portion of the tire is the lower portion 5 whose bottom 6 is the flat road-engaging tread of the tire. The tire is hollow by means of a plurality of spaced apart openings or hollows 7—7 which are severally substantially V-shaped in cross-section (Fig. 1) with the tops of the V's at the upper portion of the tire and with the bottoms of the V's in the lower portion of the tire directed towards the tread. These hollows 7 extend longitudinally, preferably continuously so, without interruption, around and through the tire in spaced, parallel relationship with each other. The upper portion of the tire is provided with slots shown in cross-section at 8—8 in Fig. 1 extending upwardly therethrough from the top of the respective V-shaped hollows. Each of these slots extends circumferentially around the inside of the tire. Clamping beads 9 are thereby provided for engagement by a plurality of clamping plates 10 at the top of each hollow of the tire, said plates being adjustably connected with the felly by the bolt means 11 operably projecting through suitably spaced holes in the felly to draw the plates towards the felly to clamp the tires securely to the wheel.

The lower portion 5 of the tire is divided into lateral parts 12—12 by a V-nosed cleft or space 13 extending up through it from the tread between the V-shaped hollows or V-nosed spaces 7 substantially to the upper portion 4 of the tire. This cleft extends circumferentially around the tire (Fig. 2) interrupted at intervals by cross-webs or bridges 14 which unite the aforesaid lateral parts 12—12 of the tire. From Fig. 1 it will be seen that the walls of this cleft diverge outwardly towards the tread of the tire. Also, said cross-webs 14 preferably are sufficiently thick to constitute an important factor in supporting the load and to this end should extend from the apex or top of the recess 13 downwardly until they are flush or substantially flush with the tread of the tire.

Each of the lateral parts 12 under its V-shaped hollow has a deep longitudinal groove 15 in its tread portion interrupted at intervals by cross-webs 16 flush with the tread of the tire uniting the sides of the groove. The tread recesses or cavities 15 thus provided give a suitable flexibility and compressibility to the nose or tread portion of each lateral part 12—12; and also cause the tread thrusts to be delivered up under the walls 26 adjacent the hollows so that said walls under load are compressed vertically and thickened laterally but are not bent and broken down. 15ª are extension recesses or cavities from the recesses or cavities 15 extending transversely in opposite directions through each half of the respective nose portions to the sides thereof, and also extending upwardly under the walls 26 as best shown in Fig. 1. From Fig. 2 it will be seen that the aforesaid cross-webs 16—16 in the nose portions of the two parts 12—12 of the tire are united endwise with the previously described cross-webs 14 of the cleft.

Preferably the adjacent cross-webs 16—16 in said parts 12—12 of the tire are transversely inclined in opposite directions as shown in Fig. 2 so that said cross-webs 14 of the cleft connect oppositely inclined webs 16—16.

The sides of the tire (see Fig. 1) steeply converge towards the tread similarly to the sides of the cleft.

It will be noted in Fig. 1 that the tread width A of an individual lateral part 12 of the tire is only about one-third of the height of the tire which is a proportion such that an individual part would be too flexible and unstable laterally to serve as a tire by itself. However, the plural lateral parts 12—12 become a practical tire of superior qualities when combined as shown and described.

Due to the V-nosed cleft and the plural V-shaped or V-nosed hollows, the illustrated tire has four relatively thin load-supporting walls 26 instead of the usual two thick walls heretofore used in tires of the same cross-section. This importantly increases the resiliency and easy riding quality of the tire. Further, said cleft permits the inner walls, when they thicken laterally under load, to spread not only into the hollows 7 but also into said cleft. Again, the cleft reduces the bulk of the nose-portions whose individual resiliency is therefore all the more easily taken care of by the tread-recesses 15 and 15ª therein. Moreover, all this lightening of the tire and increase in its resiliency are accomplished without impairing its load-carrying ability or its lateral stability. The walls 26 are still controlled to do their work by vertical compression and lateral thickening without bending and breaking down. The load-supporting cross-webs 14 of the cleft aid in this. Due to said cross-webs in the illustrated tire, the inner walls or members are more highly load-supporting than the outer members. Further, they give lateral stability to the noses of the lateral parts 12—12 by being directly united with the ends of the cross-webs 16 of said noses. Since these nose-portions support the walls 26, it follows that their stability gives stability also to said walls. In short, the lateral stability and load-carrying capacity of the whole tire are maintained in spite of the high degree of its resiliency.

17—17 are rectangular blocks suitably staggered and spaced on the rim 2 fitting into correspondingly positioned and shaped recesses in the top- or rim-surface of the tire to prevent creeping and to assist anchoring the tire on the wheel. 18 and 19 are integral projections formed respectively in the nose-recesses 15 and 15ª and in the cleft 13 acting as pebble-ejectors.

I am aware that changes and modifications may be made in the foregoing which will nevertheless be within the spirit of the foregoing disclosure and within the spirit of the annexed claims, and which as such are accordingly intended to be covered thereby.

What I claim is:

1. A cushion tire whose cross section, with the tread downwards, comprises a wheel-engaging upper portion and a lower portion integral with said upper portion composed of a plurality of integral lateral parts whose bottoms constitute the road-engaging tread of the tire, said lateral parts being severally longitudinally hollow, the hollows being contained between substantially straight side walls converging toward the tread of the tire, said lateral parts being separated laterally from each other by a circumferentially extending cleft which reaches upwardly from the tread to the upper part of the aforesaid hollows, each of said lateral parts alone being too unstable to serve as a tire, and cross webs extending at circumferential intervals across the cleft and uniting said lateral parts.

2. A cushion tire whose cross section, with the tread downwards, comprises a wheel engaging upper portion and a lower portion composed of a pair of integral halves whose bottoms constitute the road engaging tread of the tire, each of said halves having a longtiudinally extending V-shaped hollow, the base of which is located at said upper portion of the tire, said halves being separated laterally by a circumferentially extending V-shaped cleft which extends upwardly from the bottoms of said halves to said upper portion of the tire, with its apex at a point substantially in a line between the bases of the V-shaped hollows of said halves, each of said halves alone being too unstable to serve as a tire, and cross webs extending at circumferential intervals across said cleft and uniting said halves.

3. A single as distinguished from a dual cushion tire whose cross-section with the tread downwards comprises a wheel-engaging upper portion; and a lower portion integral therewith whose bottom is the road-engaging tread of the tire,—said tire being hollow by means of a plurality of spaced apart longitudinally extending hollows which are severally substantially V-shaped in cross-section with the tops of the V's at said upper portion of the tire and with the bottoms of the V's in said lower portion of the tire directed towards the tread, said lower portion of the tire being divided into lateral parts by a cleft extending up through it from the tread between said V-shaped hollows substantially to said upper portion of the tire, said cleft also extending circumferentially around the tire interrupted at intervals by cross-webs uniting said lateral parts, each of said lateral parts under its V-shaped hollow having a longitudinal groove in its tread portion interrupted at intervals by cross-webs uniting the sides of the groove, these webs and the aforesaid webs across the cleft being united endwise with one another.

4. A cushion tire whose cross-section with the tread downwards comprises a wheel-engaging upper portion; and a lower portion whose bottom is the road-engaging tread of the tire,—said tire being hollow by means of a plurality of spaced apart longitudinally extending hollows, which are severally substantially V-shaped in cross-section with the tops of the V's at said upper portion of the tire and with the bottoms of the V's in said lower portion of the tire directed towards the tread, said lower portion of the tire being divided into lateral parts by a cleft extending up through it from the tread between said V-shaped hollows, said cleft extending circumferentially around the tire interrupted by cross-webs uniting said lateral parts, each of said lateral parts having recesses in its tread portion separated by transversely extending webs, these webs and the aforesaid webs across the cleft being united endwise with one another.

5. A cushion tire whose cross-section with the tread downwards comprises a wheel-engaging upper portion; and a lower portion whose bottom is the road-engaging tread of the tire,—said tire being hollow by means of a plurality of spaced apart longitudinally extending hollows whose tops are at said upper portion of the tire and whose bottoms extend down into its lower portion, which lower portion is divided into lateral parts by a cleft extending up through it from the tread between said hollows, said cleft extending circumferentially around the tire interrupted at intervals by cross-webs uniting said lateral parts, each of which has recesses in its tread portion separated by transversely extending webs, these webs and the aforesaid webs across the cleft being united endwise with one another.

6. A tire comprising two cushion tire halves integrally connected by spaced webs, each half of said tire having tread-openings separated by transverse webs, the webs of one half of the tire being integrally connected with the webs of the other half by the aforesaid webs that connect the two halves of the tire.

7. A tire comprising two cushion tire halves integrally connected by spaced webs, each half of said tire having tread-openings separated by transversely inclined webs, the inclined webs of one half of the tire being integrally connected with the oppositely inclined webs of the other half by the aforesaid webs that connect the two halves of the tire.

8. A cushion tire comprising a wheel-engaging base portion and a flange-free lower portion integrally formed therewith, the bottom of which is the tread of the tire, said lower portion comprising a plurality of substantially straight load-supporting inner members and a plurality of inwardly inclined outer members, said inner members being laterally separated from each other and from the outer members by spaces into which they expand laterally by thickening when under load, the space between the inner members having a greater height than the spaces between the inner and outer members.

9. A cushion tire comprising a wheel-engaging base portion and a flange-free lower portion integrally formed therewith, the bottom of which is the tread of the tire, said lower portion comprising a plurality of substantially straight load-supporting inner members and a plurality of inwardly inclined outer members, said inner members being laterally separated from each other and from the outer members by spaces into which they expand laterally by thickening when under load, the space between the inner members having a greater height than the spaces between the inner and outer members, the inner members being laterally braced by a series of cross webs connecting them.

10. A cushion tire comprising a wheel-engaging base portion and a flange-free lower portion formed integrally therewith, said lower portion comprising inner and outer substantially straight space-separated load-supporting members all united at the tread towards which the outer members steeply converge, the inner being more highly load-supporting than the outer members, said lower portion having a wide ground contact to deliver the thrusts from the tread well under all of said inner and outer members, all of which thicken laterally under load and expand into said spaces without bending collapse.

11. A cushion tire comprising a wheel-engaging base portion and a flange-free lower portion formed integrally therewith, said lower portion comprising inner and outer substantially straight space-separated load-supporting members all united at the tread towards which the outer members steeply converge, the inner being more highly load-supporting than the outer members, said lower portion having a wide ground contact to deliver the thrusts from the tread well under all of said inner and outer members, all of which thicken laterally under load and expand into said spaces without bending collapse, the space between the inner members having a greater height than the spaces between the inner and outer members.

12. A cushion tire comprising a wheel-engaging base portion and a flange-free lower portion formed integrally therewith, said lower portion comprising inner and outer substantially straight space-separated load-supporting members all united at the tread towards which the outer members steeply converge, said lower portion having a wide ground contact to deliver the thrusts from the tread well under all of said inner and outer members, all of which thicken laterally under load and expand into said spaces without bending collapse.

13. A cushion tire comprising a wheel-engaging base portion and a flange-free lower portion formed integrally therewith, said lower portion comprising inner and outer substantially straight space-separated load-supporting members all united at the tread toward which the outer members steeply converge, said lower portion having a circumferential series of cavities extending radially inward from the tread and transverse cavities in the tread portion extending laterally toward the sides thereof from the first named cavities.

14. A cushion tire comprising a wheel-engaging base portion and a flange-free lower portion formed integrally therewith, said lower portion comprising inner and outer substantially straight space-separated load-supporting members all united at the tread toward which the outer members steeply converge, said lower portion having a circumferential series of cavities extending radially inward from the tread and transverse cavities in the tread portion extending laterally toward the sides thereof from the first named cavities which are deeper than the last named cavities.

15. A cushion tire comprising a wheel-engaging base portion and a flange-free lower portion formed integrally therewith, said lower portion comprising inner and outer substantially straight load-supporting members all united at the tread towards which the outer members steeply converge, said lower portion having a circumferential series of cavities penetrating deeply into it from the tread and extending laterally across a substantial portion of the width of the tread.

16. A cushion tire comprising a wheel-engaging base portion and a flange-free lower portion integrally formed therewith, the bottom of which is the tread of the tire, said lower portion comprising a plurality of substantially straight load-supporting inner and outer members united into a unitary tread toward which the outer members steeply converge, said lower portion being penetrated by openings under said inner and outer members extending up into it from the tread and comprising a circumferential series of such openings under the inner, and transversely extending openings under the outer members.

17. A cushion tire comprising a wheel-engaging base portion and a flange-free lower portion integrally formed therewith, the bottom of which is the tread of the tire, said lower portion comprising a plurality of substantially straight load-supporting inner and outer members united into a unitary tread toward which the outer members steeply converge, said lower portion being penetrated by openings under said inner and outer members extending up into it from the tread and comprising a circumferential series of such openings under the inner, and transversely extending openings under the outer members, said latter openings being reduced in height at the sides of the tire.

18. A cushion tire comprising a wheel-engaging base portion and a flange-free lower portion integrally formed therewith, the bottom of which is the tread of the tire, said lower portion comprising a plurality of substantially straight load-supporting inner and outer members united into a unitary tread toward which the outer members steeply converge, said lower portion being penetrated by circumferentially spaced openings extending up into it from the tread under the inner and outer members.

19. A cushion tire comprising a wheel-engaging base portion and a flange-free lower portion integrally formed therewith, the bottom of which is the tread of the tire, said lower portion comprising a plurality of substantially straight load-supporting inner members and a plurality of inwardly inclined outer members, said inner members being laterally separated from each other and from the outer members by V-nosed spaces into which they expand laterally by thickening when under load the space between the inner members having a greater height than the spaces between the inner and outer members.

20. A cushion tire comprising a wheel-engaging base portion and a flange-free lower portion formed integrally therewith, said lower portion comprising inner and outer substantially straight load-supporting members separated from one another by V-nosed spaces, all of said members being united at the tread toward which the outer members steeply converge, said lower portion having a wide ground contact to deliver the thrusts from the tread well under all of said inner and outer members, all of which thicken laterally under load and expand into said spaces without bending collapse.

In testimony whereof, I have signed my name to this specification this 15 day of November, 1918.

MAX CYRUS OVERMAN.